United States Patent Office 3,395,519
Patented Aug. 6, 1968

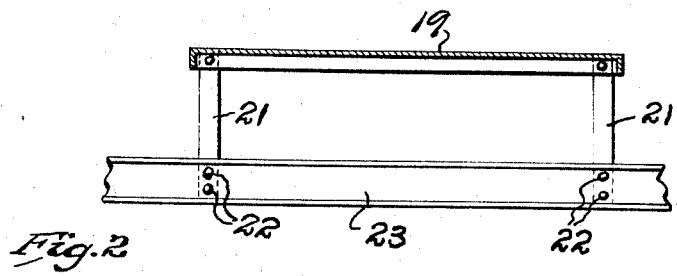
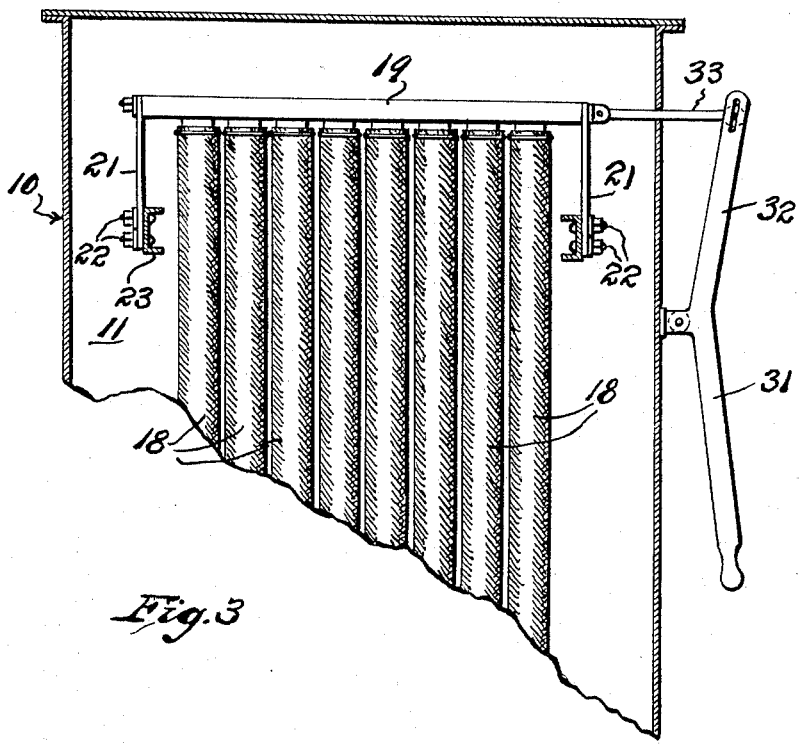

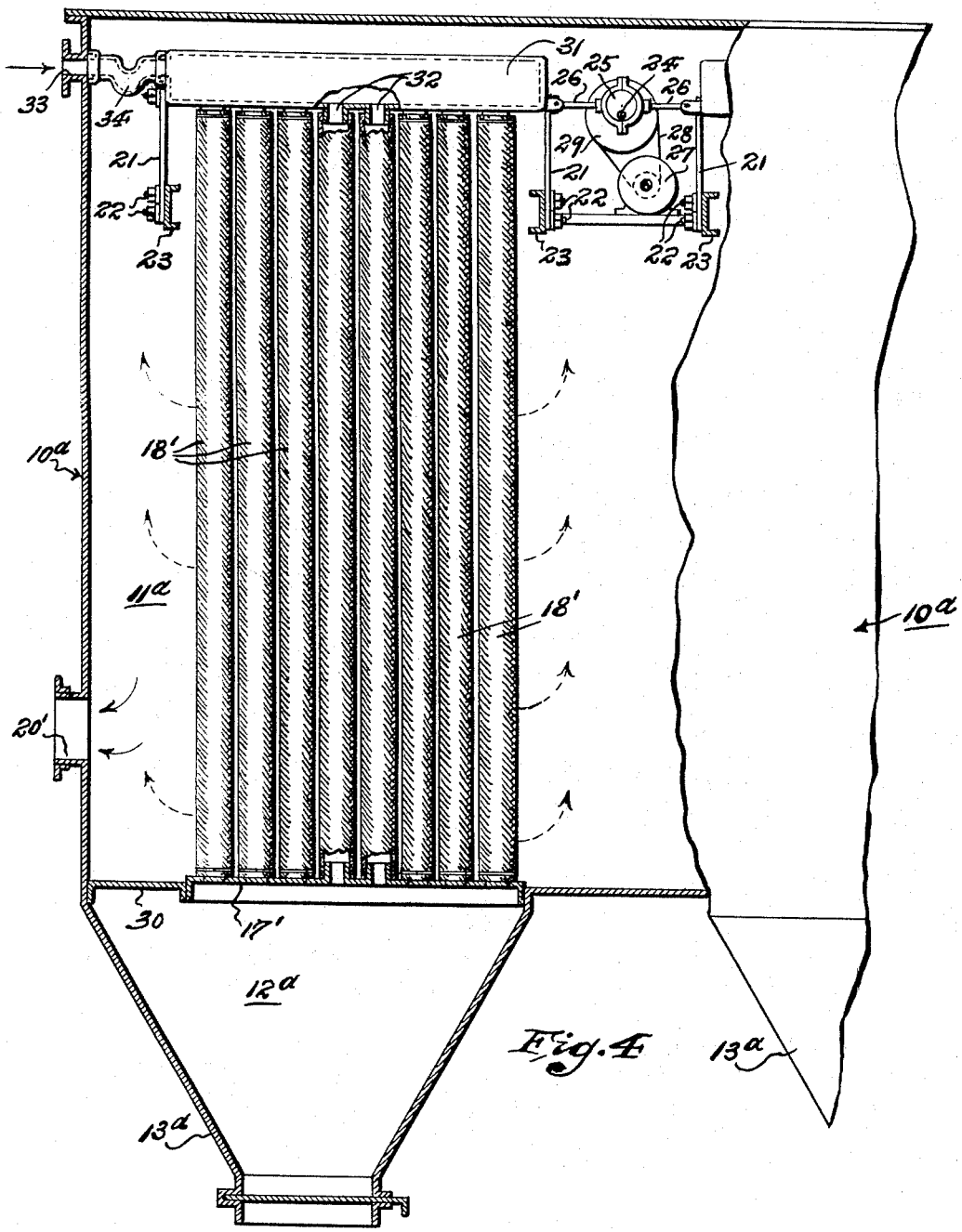

3,395,519
DUST SEPARATOR AND COLLECTOR
Arthur J. Kleissler, South Orange, N.J., assignor to G. A. Kleissler Company, Newark, N.J., a corporation of New Jersey
Filed Mar. 31, 1966, Ser. No. 539,012
1 Claim. (Cl. 55—304)

ABSTRACT OF THE DISCLOSURE

Industrial apparatus for separating dust from air or any other gas is described in which a plurality of elongated, vertically disposed, tubular fabric filter elements are suspended from an upper plate member mounted on the upper ends of a plurality of flat leaf springs the lower ends of which are fixedly mounted on the frame or body of the apparatus. Accumulated dust within the tubular filter elements is removed by shaking the filter elements by imparting back and forth reciprocal motion to the upper plate member; the leaf springs serving to support the weight of the upper plate member, the filter elements and accumulated dust and to permit such motion while limiting its extent and dampening vibration caused thereby.

---

This invention relates to improvements in apparatus for separating dust from air or other gas, by which the same is impregnated, and of the type utilizing tubular woven fabric filter elements, which are pervious to air or gas but retentive to dust, said filter elements being provided with means for vibrating or shaking the same, whereby to dislodge the separated dust therefrom for deposit in suitable collecting means.

In many dust separators of the aforesaid type, as heretofore known to the prior art, the tubular filter elements are attached at selected ends thereof, to a reciprocable means which is operative to vibrate or shake the same, such e.g., as a plate or frame which is movable in supporting guides often including ball bearing or like anti-friction means. A noted disadvantage of such supported and guided vibrator plates is that the same, and included ball bearings or like anti-friction means, is of relatively high structural complication and cost, is subject to clogging by dust, and is subject to wear necessitating constant maintenance expense, especially when the dust impregnated air or other gas, undergoing treatment, is of high temperature and of abrasive or corrosive character.

Having in view the disadvantages of the above mentioned prior art devices and apparatus, it is an object of the present invention to provide an improved or simple means for supporting the movable vibrator member to which the tubular filter elements are attached, said means comprising flexible flat leaf springs to which respective ends of the vibrator member are connected, thus eliminating necessity for provision of member guide means and included anti-friction means, and thereby substantially reducing the cost of the separator apparatus and maintenance thereof.

Another object of this invention is to provide flat leaf springs, for supporting the vibrator member, which are of relatively short length as compared to the lengths of the tubular filter elements; said leaf springs being affixed by ends thereof to stationary frame or body portions of the separator apparatus to extend therefrom, and to the free ends of which springs the ends of the vibrator member are attached so as to be supported thereby, subject to back and forth shaking or vibrating movement; said flat leaf springs being disposed normally perpendicular to the plane of said vibrator member.

The above and other objects of this invention will be understood from the following description of illustrative embodiments of the same shown in the accompanying drawings, in which:

FIG. 2 is a fragmentary transverse sectional view thereof, taken on line 2—2 in FIG. 1;

FIG. 3 is a fragmentary cross sectional view showing a modified form of a dust separator and collector embodying this invention.

FIG. 4 is a cross sectional view, in fragmentary part elevation, showing another further modified form of dust separator and collector according to this invention.

Like characters of reference are employed in the above described views, to indicate corresponding parts.

Figure 1:
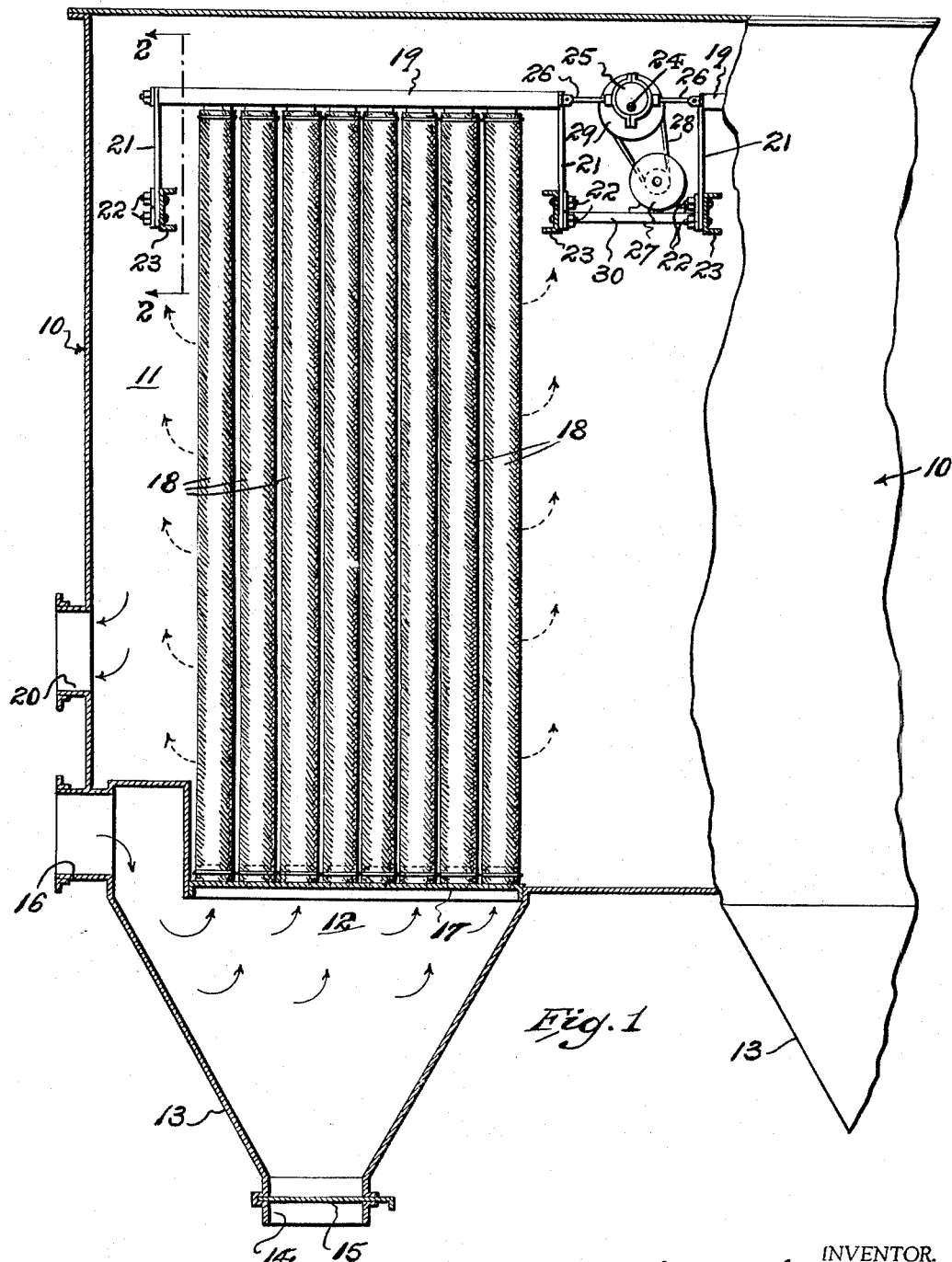
FIG. 1 is a cross sectional view, in fragmentary part elevation of one form of a dust separator and collector according to this invention.

Referring to FIG. 1, which illustrates one form of dust separator and collector according to this invention, the reference character 10 indicates a casing, the interior of which is subdivided to provide an upper dust separator chamber 11 and a lower dust collector chamber 12. The dust collector chamber 12 is formed at its lower end to provide one or more dust receiving hoppers 13. At their lower terminal ends said hoppers 13 are provided with dust discharge outlets 14, which are normally closed by movable damper or shut-off member 15.

In this form of the apparatus, dust laden air is delivered into the upper end of the dust collector chamber 12 through an intake passage or port 16, to and through which the dust laden air is moved from the surrounding outer atmosphere by suitable blower means (not shown).

The division between the upper dust separator chamber 11 and the dust collector chamber 12 includes a perforated stationary plate 17, to which lower ends of tubular fabric filter elements 18 are attached, in condition to be open to reception of the dust laden air which is delivered into said dust collector chamber 12, as aforesaid.

The dust laden air, or other gas, delivered into the dust collector chamber 12 loses velocity upon entrance into the latter, so that some dust contained therein tends to drop out therefrom, by gravity, into a hopper section 13. The remaining dust laden air will enter and rise through the tubular fabric filter elements 18.

Disposed within the upper end of the dust separator chamber 11 is a vibrator member in the form of a movable plate 19, to which the upper ends of the tubular fabric filter elements 18 are attached, and by which the upper ends of the latter are closed. As thus supported by and between said lower stationary plate 17 and the upper movable plate 19, said filter elements 18, being of substantial length, extend perpendicularly upward through the interior of the dust separator chamber 11, whereby dust free air, escaping through the pervious walls of said tubular filter elements 18 into the separator chamber 11, may be discharged or withdrawn from the latter chamber through a suitably located outlet conduit or port 20, by means of a suction blower or the like (not shown).

Since the fabric walls of the tubular filter elements 18 are pervious to passage therethrough of air or other gas but retentive of dust, the dust will be separated from the air or other gas and will be accumulated by deposit upon the inner surfaces of said filter elements.

To remove the separated and accumulated dust from the walls of the filter elements 18, means are provided for reciprocating the upper movable plate 19 back and forth, so as to shake or vibrate said filter elements, and thus to dislodge the dust from the walls thereof, whereupon the freed dust can drop downward through said filter elements and into a hopper 13 of the collector chamber 12.

The means for supporting the movable plate 19, subject to back and forth vibration or movement according to this invention, comprises upstanding resilient flat leaf springs 21, to and between free ends of which the movable plate 19 is connected, at opposite ends thereof. These flat leaf springs 21 are affixed by their lower ends, as by bolts 22, to frame portions 23, or other stationary parts of the separator and collector casing. Said leaf springs 21 are of relatively short length as compared with the substantially greater lengths of the tubular filter elements 18 whereby a limited amplitude of spring movement is provided, together with a maximum of resilient tension in operation.

Due to the support of the movable plate 19 by the described relatively short, upstanding, flat leaf springs 21, which are perpendicular to the plane of said movable plate, and which have their faces transverse to the longitudinal path of movement of the latter, all necessity for use of side guide supports for the movable plate, and any included anti-friction means, is avoided, while nevertheless undesirable side sway of the movable plate is inhibited.

As shown in FIG. 1 the means for vibrating the movable plate 19 may be power actuated. One arrangement to this end comprises a power shaft 24 operative to actuate eccentric devices 25, which are coupled to an end or ends of a movable plate or plates 19 by connecting rods 26. Said power shaft 24 may be driven from a motor 27 or other prime mover by suitable transmission means, e.g., drive belt 28 and pulley 29. The motor 27 can be supported within the apparatus casing by a stationary element 30 of the apparatus framework or casing (see FIG. 1), or, if desired, exteriorly of the apparatus casing.

It will be understood that ordinarily the shaking operations are carried on intermittently at selected intervals between still dust separating periods.

The weight of the movable plate 19, together with the weight of the filter elements 18 and the dust adhering to the same, is often considerable. In operation, this weight must be shaken back and forth many times a minute, and consequently the inertia must be stopped or overcome at the end of each forward and back movement. When the movable plate is merely slidable in side guides and its movement is stopped and started by an eccentric or other drive means, all the forces and shocks of overcoming inertia are transmitted to the latter, and in turn the framework and body of the apparatus. This results in live load application to the entire apparatus, and may well be objectionable, especially if the apparatus is installed on a high steel framework or on a building roof.

Under the provisions of this invention, the movable plate 19 is solely supported by the resilient short leaf springs 21, so that the inertia of the plate 19 and dust laden filter elements 18 is absorbed by the increasing tensional pressure of the springs at the end of each forward and back stroke, so that thrust is applied by the springs to start an ensuing stroke. This results in a smooth and substantially vibration free operation, since the eccentric, or other drive means, while producing desired movement, does not receive full shock load.

As known to the art, the apparatus may be constructed and arranged to furnish a single dust separator and collection unit, or to provide a desired multiple of such units spaced in longitudinal and/or lateral relation; the latter arrangement being indicated in FIG. 1. When a multiple arrangement is provided, the dust separating operation may be substantially continuous, since selected units may be operated to shake their filter elements, while other units are still for dust separating effect.

Referring now to FIG. 3, it is shown thereby that the spring supported movable plate 19 may be reciprocated by hand instead of by power as above described. This is frequently of advantage in connection with relatively small capacity dust separating and collecting requirements, capable of being carried on by one or more simple units. One arrangement for manual operation, as illustratively shown in FIG. 3, comprises a pivoted hand operable lever 31 which can be mounted externally on a side of the casing 10, with its upper arm 32 coupled by a connecting rod 33 to an end of the movable plate 19.

Referring now to FIG. 4, which shows a further modified form of the apparatus according to this invention, the reference character 10ª indicates a casing, the interior of which is subdivided to provide an upper dust separator chamber 11ª and a lower dust collector chamber 12ª, the latter terminating in a dust discharge hopper or hoppers 13ª. In this case, the separator chamber 11ª is divided from the collector chamber 12ª by a partition wall 30, which includes a perforated stationary plate 17' to which lower open ends of tubular fabric filter elements 18' are attached in communicating relation to said collector chamber 12ª. Said filter elements extending upwardly within the separator chamber 11ª. In this modified form of the apparatus, instead of a vibrator member in the form of a plate adapted to close the upper ends of the filter elements, as in the previously described structures, the vibrator member is provided in the form of a hollow or chambered member 31 having openings 32 to which the upper ends of said filter elements 18' are connected, so as to communicate with the interior or plenum provided by said vibrator member 31. The dust laden air, in this case, is delivered, by suitable blower means (not shown) through an intake port 33 by way of a flexible conduit or hose 34 which is connected in communication with the interior or plenum of the vibrator member 31, and thence into the filter elements 18', so that dust free air may escape from the latter into the separator chamber 11ª, to be discharged therefrom through a suitably located outlet port 20', by means of a suction blower or the like (not shown). The flexible conduit or hose 34 will readily yield to the shaking vibration or movement imparted to vibratory member 31. Dust, accumulating on the walls of the filter elements 18', will be dislodged therefrom, when the filter elements are shaken by the vibratory movements of the member 31, and can thence pass into the collector chamber 12ª. As in the previously described dust separator and collecting apparatus, the vibratory member 31 is supported, subject to back and forth shaking movement, by upstanding resilient flat leaf springs 21, to and between free ends of which the vibrator member 31 is connected.

The means for oscillating the vibratory member 31 may be power operated, as by actuating means such as illustratively shown in FIG. 1, and identified in FIG. 4 by corresponding reference characters, or by manually actuated means, such as shown in FIG. 3.

As heretofore described, the shaking operations are ordinarily carried out intermittently at selected intervals between dust separating periods.

With respect to the FIG. 4 modified form of the apparatus, all the advantages, referred to with respect to the previously described embodiments of this invention, will also be attained.

Having now described my invention and its mode of operation, it will be understood that no limitation to the particular described embodiments thereof is intended beyond the scope of the here-following claim.

I claim:

1. An apparatus for separating dust from a gas, comprising a casing, said casing being separated into an upper dust separator chamber and a lower dust collector chamber by a bottom plate member having a plurality of perforations therein, said upper dust separator chamber having an outlet in the side wall thereof for dust-free air and said lower dust collector chamber having valve means for removal of accumulated dust therefrom, an upper plate member having opposite ends and a plenum therein and a plurality of perforations in the lower surface thereof, a plurality of elongated, vertically disposed tubular fabric filter elements having open ends, the upper ends of said filter elements being suspended from said upper plate member and being in communication with said plenum through said perforations, the lower ends of said filter elements being connected to said bottom plate member and in communication with the lower dust collector chamber through the perforations in said bottom plate member, an inlet opening in the side wall of said dust separator chamber, a flexible conduit connected between said inlet opening and the upper plate member and in communication with the plenum thereof, means for introducing dust-laden gas under pressure into said apparatus through said flexible conduit and plenum and into the upper open ends of said filter elements, whereby dust-free gas is caused to pass out of said filter elements through the sides thereof and out of the outlet in said upper dust separator chamber, dust separated from said gas building up as a filter cake on the interior walls of said filter elements, a plurality of vertically elongated flat leaf springs within said dust separator chamber, at least one of said springs mounted at each of said opposite ends of said upper plate members, each of said leaf springs being of relatively short length compared to the length of said filter elements, said opposite ends of said upper plate member being attached to said leaf springs, said leaf springs mounting said upper plate member for horizontal back and forth movement, frame portions within said dust separator chamber disposed above said bottom plate, below said upper plate member and at said opposite ends of said upper plate member, the lower end of each said spring being rigidly attached to said frame portions, and means to impart horizontal back and forth reciprocal motion to said upper plate member to shake said filter elements and dislodge accumulated dust therefrom including a base plate mounted on said frame portions, a motor having a drive shaft mounted on said base plate, an eccentric mechanism connected to said drive shaft and a link connecting said eccentric mechanism to said upper plate member, all located within said casing, said flat leaf springs supporting the entire weight of said upper plate member, the filter elements, and accumulated dust therein, and dampening and reducing vibration of the apparatus caused by the horizontal back and forth reciprocal movement of the upper plate member on shaking to dislodge accumulated dust.

References Cited

UNITED STATES PATENTS

| | | | |
|---|---|---|---|
| 1,295,216 | 2/1919 | Schmitt | 55—300 |
| 1,509,912 | 9/1924 | Stebbins | 55—304 X |
| 1,928,670 | 10/1933 | McCrery | 55—304 X |
| 2,010,898 | 8/1935 | Ruemelin | 550—314 X |
| 2,057,578 | 10/1936 | Kleissler | 55—305 |
| 2,318,395 | 3/1943 | Hornbrook | 55—291 X |
| 2,805,732 | 10/1957 | Martinez | 55—341 X |
| 2,845,140 | 7/1958 | Luhr | 55—291 X |
| 3,053,031 | 10/1962 | Vedder et al. | 55—304 X |

FOREIGN PATENTS

| | | |
|---|---|---|
| 1,077,085 | 4/1954 | France. |
| 332,475 | 7/1930 | Great Britain. |
| 883,355 | 11/1961 | Great Britain. |
| 402,087 | 2/1943 | Italy. |

HARRY B. THORNTON, *Primary Examiner.*

D. TALBERT, *Assistant Examiner.*